United States Patent
AbdelAziz et al.

(10) Patent No.: US 7,461,130 B1
(45) Date of Patent: Dec. 2, 2008

(54) METHOD AND APPARATUS FOR SELF-ORGANIZING NODE GROUPS ON A NETWORK

(75) Inventors: Mohamed M. AbdelAziz, Santa Clara, CA (US); Bernard A. Traversat, San Francisco, CA (US); Andre Marques da Fonseca, Campbell, CA (US); Sriranga R. Veeraraghavan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 772 days.

(21) Appl. No.: 10/997,725

(22) Filed: Nov. 24, 2004

(51) Int. Cl.
*G06F 15/16* (2006.01)

(52) U.S. Cl. .................. 709/208; 709/209; 709/210; 709/211; 709/230

(58) Field of Classification Search ......... 709/208–211, 709/230
See application file for complete search history.

(56) References Cited

U.S. PATENT DOCUMENTS

| | | | |
|---|---|---|---|
| 5,781,745 A | | 7/1998 | Ramelson et al. |
| 5,875,309 A | | 2/1999 | Itkowsky et al. |
| 5,928,345 A | * | 7/1999 | Tetzlaff et al. .............. 710/107 |
| 6,195,688 B1 | * | 2/2001 | Caldwell et al. ............ 709/208 |
| 6,553,423 B1 | | 4/2003 | Chen |
| 6,597,956 B1 | | 7/2003 | Aziz et al. |
| 6,681,232 B1 | | 1/2004 | Sistanizadeh et al. |
| 6,795,415 B1 | | 9/2004 | Suonvieri |
| 6,813,501 B2 | | 11/2004 | Kinnunen et al. |
| 6,888,459 B2 | | 5/2005 | Stilp |
| 6,892,230 B1 | | 5/2005 | Gu et al. |
| 7,277,417 B2 | * | 10/2007 | Palm et al. .................. 370/338 |
| 2003/0188019 A1 | | 10/2003 | Wesley |
| 2004/0030743 A1 | | 2/2004 | Hugly et al. |
| 2004/0030794 A1 | | 2/2004 | Hugly et al. |
| 2004/0031038 A1 | | 2/2004 | Hugly et al. |
| 2004/0218620 A1 | * | 11/2004 | Palm et al. .................. 370/445 |

OTHER PUBLICATIONS

D. L. Parnas, "A Technique for Software Module Specification with Examples," Communications of the ACM, vol. 15, No. 5, May 1972, (pp. 330-336).
Goedicke et al., "On the Specification of Software Components," 1991 IEEE, (pp. 166-174).
Kalnis, et al., "An Adaptive Peer-to-Peer Network for Distributed Caching of OLAP Results," ACM 2002, pp. 25-36.
Braynard, et al., "Opus: An Overlay Peer Utility Service," IEEE 2002, pp. 167-178.

* cited by examiner

*Primary Examiner*—Liangche A Wang
(74) *Attorney, Agent, or Firm*—Robert C Kowert; Meyertons, Hood, Kivlin, Kowert & Goetzel, P.C.

(57) ABSTRACT

Method and apparatus for the self-organization of nodes into groups in network computing environments. Embodiments may provide the ability to deploy nodes on a network, and to allow the nodes to organize into groups without human intervention. In one embodiment, a node may broadcast a query looking for a master node for the group. If the query produces no responses, the node may self-elect as the master node for the group and the node may broadcast its presence as the master node. If two or more nodes self-elect as master nodes, the nodes may negotiate to determine which node will be the master node. If the master node becomes unavailable, the remaining nodes in the group may elect a new master node. Some embodiments may be implemented on a peer-to-peer platform, such as the JXTA peer-to-peer platform, which may allow the scope of the group to span subnetworks and networks.

30 Claims, 13 Drawing Sheets

METHOD AND APPARATUS FOR SELF-ORGANIZING NODE GROUPS ON A NETWORK

BACKGROUND OF THE INVENTION

1. Field of the Invention

This invention relates to computer networking, and more particularly to the self-organization of groups of nodes on a network.

2. Description of the Related Art

Computer networks may be described as collections of two or more nodes that are interconnected through wired or wireless network interfaces so that each node can communicate, either directly or indirectly, with at least one other node on the network. A node may be any device that has the hardware and software necessary to connect to the network through wired or wireless network interfaces, and to communicate with other nodes on the network. A node may also be a software entity such as an application or service that resides on a device that is configured to connect to the network. An example of such a software entity is a server. Note that a device may host one or more software entities that each may be configured as a node on the network. For example, one device may host two servers that are each distinct nodes on the network.

Collections of two or more nodes may be grouped together for many applications in computer networks. Examples of such applications include, but are not limited to, application server clusters and grid computing systems. In many such applications, one, or sometimes more, of the nodes may be designated to serve as a central point for management of the nodes in the group. A node designated to serve as a central point of management may be referred to herein as a master node. The nodes in the group that are not master nodes may be referred to herein as "slave" nodes. Conventionally, a system administrator has to manually configure the collection of nodes to function together as a group. The system administrator also manually designates and/or configures one or more of the nodes to be the master node(s) for the group. If, during operation, the master node goes down or becomes unavailable or unable to fulfill its function as master node for the group for any reason, the group may be unable to perform its function unless and until the system administrator gets the master node back online or manually configures and designates another node to take over the role of master node.

Peer-to-Peer Networking

The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. In addition to improving the performance of information discovery, content delivery, and information processing, such a style also can enhance the overall reliability and fault-tolerance of computing systems.

FIGS. 1A and 1B are examples illustrating the peer-to-peer model. FIG. 1A shows two peer devices 104A and 104B that are currently connected. Either of the two peer devices 104 may serve as a client of or a server to the other device. FIG. 1B shows several peer devices 104 connected over the network 106 in a peer group. In the peer group, any of the peer devices 104 may serve as a client of or a server to any of the other devices.

JXTA

Sun Microsystems' JXTA™ is an exemplary peer-to-peer platform. Peer-to-peer platforms such as JXTA may provide protocols for building networking applications that thrive in dynamic environments. JXTA technology is a set of open protocols that allow any connected device on the network ranging from cell phones and wireless PDAs to PCs and servers to communicate and collaborate in a peer-to-peer (P2P) manner. JXTA peers create a virtual network where any peer can interact with other peers and resources directly even when some of the peers and resources are behind firewalls and NATs or are on different network transports. In JXTA, every peer is identified by an ID, unique over time and space. Peer groups are user-defined collections of entities (peers) that may share a common interest. Peer groups are also identified by unique IDs. Peers may belong to multiple peer groups, discover other entities and peer resources (e.g. peers, peer groups, services, content, etc.) dynamically, and publish themselves and resources so that other peers can discover them.

SUMMARY

Embodiments of a method and apparatus for the self-organization of nodes into groups in network computing environments are described. Embodiments of a node group self-organization mechanism, which may be referred to herein as a master node mechanism, may provide the ability to deploy multiple services or nodes on or as a network, and to allow the nodes or services to automatically organize into groups including master node(s) and slave node(s) without human intervention. In embodiments, two or more nodes may be connected to a network or interconnected to form a network, and the installed nodes may then self-organize to form an autonomous network, or group, on the network to provide or perform some function, service, or application on the network. The nodes in the group may elect or determine one of the installed nodes to serve as a master node for the group. If the master node later becomes unavailable or unable to perform its function as master node, the other nodes may detect the loss of the master node and determine or elect a different node to take over in the role of master node for the group.

Embodiments may provide a mechanism for master node discovery. In one embodiment, through predefined virtual endpoints, a node may broadcast a query looking for a master node on the network, or within a group of nodes on the network. If a master node is discovered, the querying node may cache information about the master node for future use. Embodiments may also provide a mechanism for master node self-election. If a query for a master node produces no responses, for example within a specified period, the querying node may assume master node responsibilities; in other words, the node may designate itself as the master node for the group of nodes within the scope of which the query was broadcast. The node may then broadcast its presence on the network or within the group as the master node.

Embodiments may also provide a mechanism for overcoming collisions. Two or more nodes within a group of nodes may self-elect as master nodes. In one embodiment, each self-elected master node may wait for a specified period for any broadcast from other possible self-elected master nodes. If a broadcast from another master node or master nodes is received, the self-elected master nodes may enter a negotiation to determine which node will be the master node for the group. The node that is selected to be the master node may then broadcast a message indicating that it is the master node for the group.

Embodiments of the master node mechanism may also provide a mechanism for recovering from the failure of a master node within a group of nodes. If the master node for a group of nodes becomes unavailable, one or more of the other nodes within the group may detect the absence of the master node. Upon detecting failure of the master node, the nodes in the group may go through a similar process as that described above (self-election and negotiation to resolve collisions, if any) to determine a new master node for the group.

Some embodiments may use a peer-to-peer platform, such as the JXTA peer-to-peer platform, as an underlying platform for self-organizing groups of nodes and self-election of master nodes for the node groups. In an embodiment using JXTA, JXTA peer groups and protocols allow the scope of the master node mechanism to span subnetworks and networks.

Figure 1A:
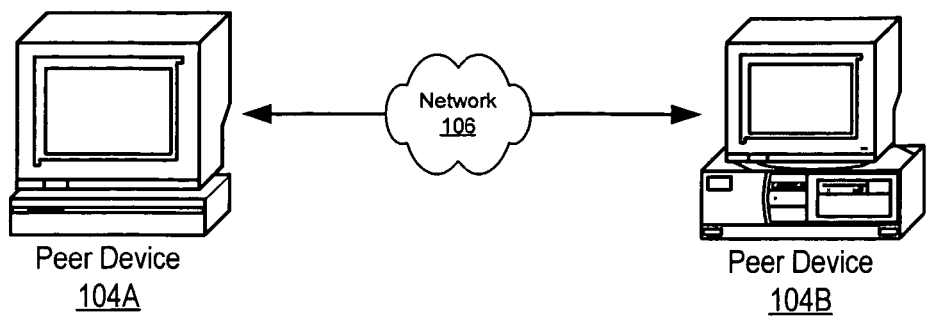
FIG. 1A illustrates a prior art example of two devices that are currently connected as peers.
Figure 1B:
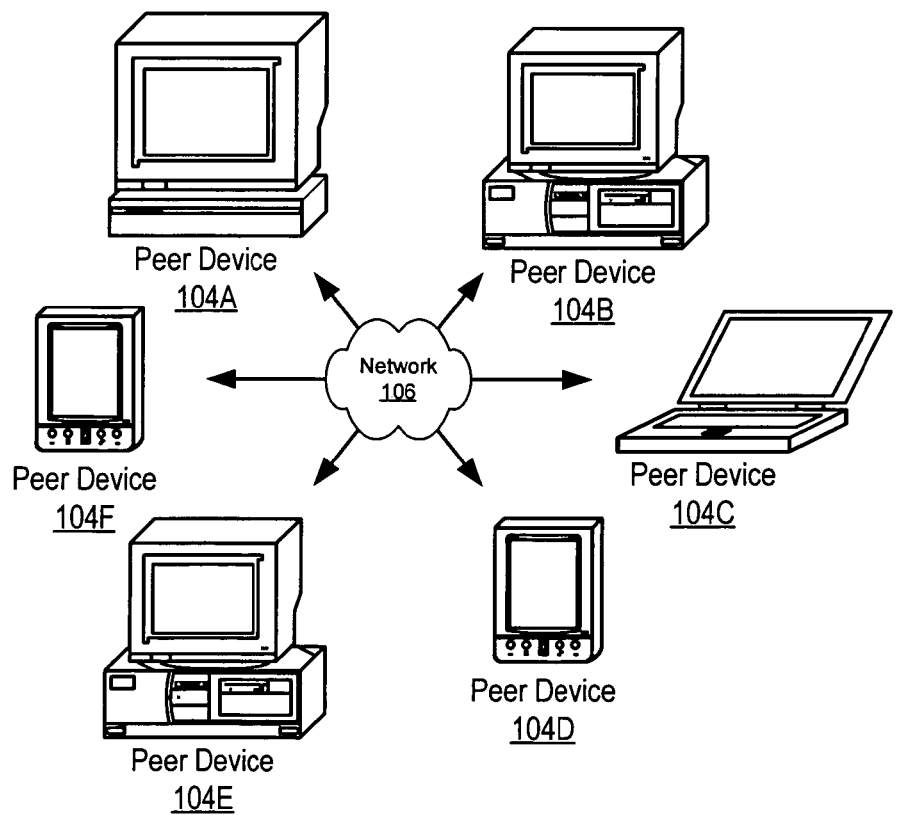
FIG. 1B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for the self-organization of nodes into groups in network computing environments are described. Embodiments may provide a framework to deploy multiple services or nodes on (or as) a network, and to allow the nodes or services to automatically organize into autonomous networks or groups including master node(s) or services and slave node(s) or services, without human intervention. Embodiments may enable groups, or autonomous networks, of nodes or services to scale, collaborate, and to be highly available. Embodiments may lower the customer's total cost of ownership by reducing or eliminating the need to maintain an IT infrastructure to maintain, configure and deploy groups of nodes or services. Nodes and services may collectively be referred to as "nodes" for simplicity in this document.

Embodiments may enable autonomous, self-organizing networks or groups of nodes including a master node that may provide or control one or more functions within the group including, but not limited to, aggregation points, failover, load balancing, and data replication. Using embodiments, two or more nodes may be connected to a network or interconnected to form a network, and the installed nodes may then self-organize to form an autonomous network, subnetwork, group or subgroup (which may collectively be referred to herein as simply a "group" or "node group") on the network to perform a function, service, or application on the network. The nodes may elect or determine one of the installed nodes to serve as a master node for the group. If the master node later becomes unavailable or unable to perform its function as master node, the other nodes may detect the loss of the master node and determine or elect a different node to take over the role of master node for the group.

Embodiments of a node group self-organization mechanism, which may be referred to herein as a master node mechanism, may provide a mechanism for master node discovery. In one embodiment, through predefined virtual endpoints, a node may broadcast a query looking for a master node on the network, or within a group of nodes on the network. If a master node is discovered, the querying node may cache information about the master node for future use. Embodiments may also provide a mechanism for master node self-election. If a query for a master node produces no responses, for example within a specified period, the querying node may assume master node responsibilities; in other words, the node may designate itself as the master node for the group of nodes within the scope of which the query was broadcast. The node may then broadcast its presence on the network or within the group as the master node.

Embodiments of the master node mechanism may also provide a mechanism for overcoming collisions. It is possible that two or more nodes within a group of nodes may self-elect as master nodes. In one embodiment, each self-elected master node may wait for a specified period for any broadcast from other possible self-elected master nodes. If a broadcast from another master node or master nodes is received, the self-elected master nodes may enter a negotiation to determine which node will be the master node for the group. In one embodiment, the election process to determine which node will be the master node may be through a nodes order in a list of nodes. Other embodiments may use other mechanisms for electing a master node from two or more self-designated master nodes within a group. The node that is selected to be the master node may then broadcast a message indicating that it is the master node for the group.

Embodiments of the master node mechanism may also provide a mechanism for recovering from the failure of a master node within a group of nodes. If the master node for a group of nodes becomes unavailable, one or more of the other nodes within the group may detect the absence of the master node, for example through periodic or aperiodic polling of the master node or through failure of the master node to respond to a message during normal operations. Alternatively, a master node may broadcast a message within the group announcing that it is going to become unavailable before going offline. Upon detecting failure of the master node, the nodes in the group may go through a similar process as that described above to determine a new master node for the group, including self-election and resolution of collisions through negotiation.

In one embodiment, collections of nodes may self-organize to perform two or more different applications with a master node for each application. In this embodiment, each different application may be considered a different "channel"; there are multiple channels that each node can issue queries on, with each channel having (or self-electing) its own master node. Note that a node can serve as master node for one or more applications or channels.

In a physical network topology, a collection of nodes needs to be accessible to each other to use the master node mechanism to self-organize as a node group and to elect a mater node. For example, if IP multicast is being used, then any nodes within the local subnetwork or within the reach of IP multicast can participate in the self-organization and master node election process as described herein.

Some embodiments may use a peer-to-peer platform, such as the JXTA peer-to-peer platform, as an underlying platform for the self-organizing of groups of nodes and the election of master nodes for the node groups. Using a peer-to-peer platform such as JXTA, self-organizing groups of nodes as described herein are not necessarily limited in scope to subnetworks on the network, but may extend across subnetworks, firewalls, etc. In embodiments using JXTA, JXTA peer groups, which may span subnetworks and networks, may be used as the scope for the master node mechanism. In JXTA, peer groups may serve as the scope of node discovery and/or querying for master nodes, and JXTA protocols may be leveraged as protocols for performing node discovery and/or querying for master nodes. There are no limitations on where peer nodes participating in the group have to be located using JXTA protocols and JXTA peer groups as the scope for the master node mechanism. A peer-to-peer platform implementation is further described later in this document.

FIGS. 2A through 9 illustrate means for a collection of nodes to self-organize as a group of nodes on a network to perform one or more applications on the network, means for the group of nodes to determine one of the nodes to serve as master node for the group, and means for the group of nodes to determine a new master node for the group if the master node goes down.

Figure 2A:
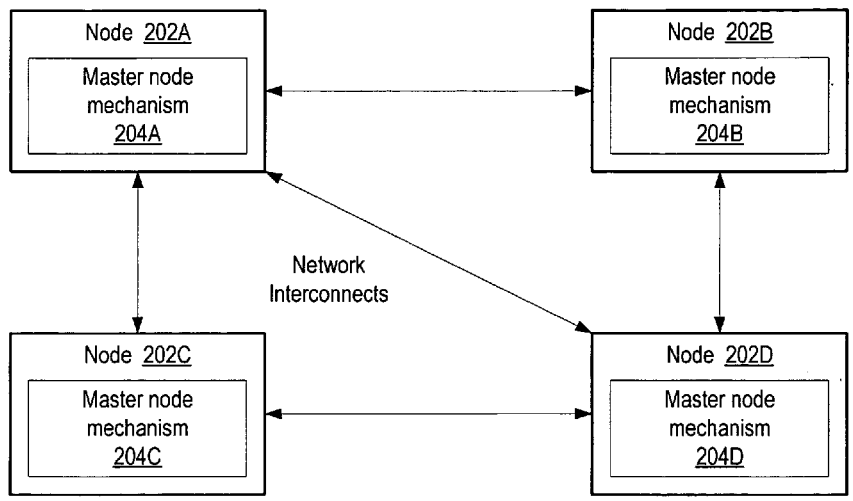
FIGS. 2A and 2B illustrate an exemplary collection of nodes self-organizing into a node group according to one embodiment.
Figure 2B:
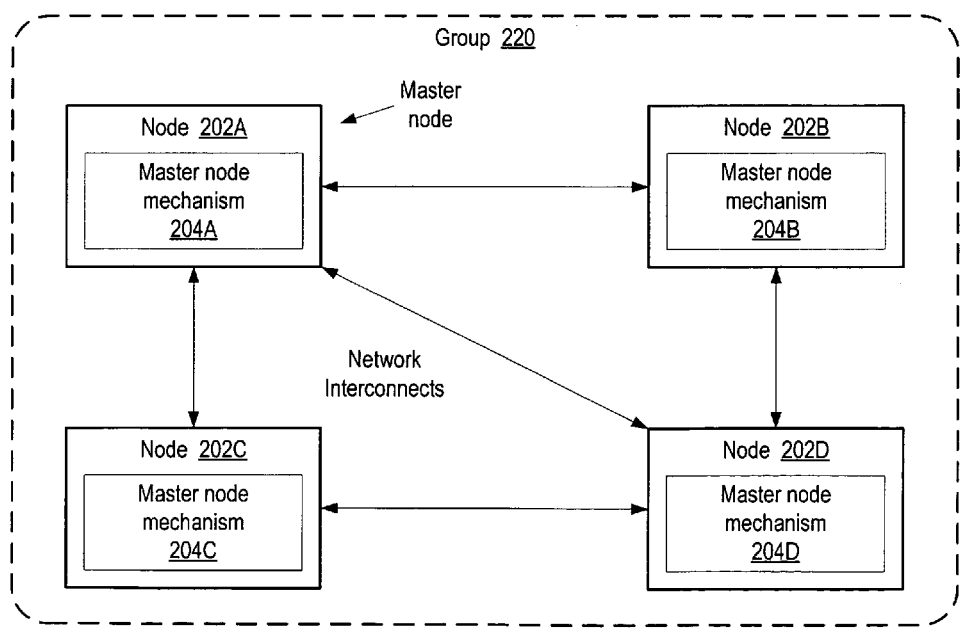

Embodiments provide dynamic network behavior where nodes self-organize into groups, self-elect a master node, and if the master node fails, another node takes over as the master node. FIGS. 2A and 2B illustrate an exemplary collection of nodes self-organizing into a node group according to one embodiment. As illustrated in FIG. 2A, two or more nodes 202, each including an instance of a master node mechanism 204, may be interconnected to form a network or interconnected on a network via wired or wireless network connections. In this example, four nodes (nodes 202A through 202D) are interconnected. Note that each node 202 may be, but is not necessarily, directly connected to each other node, but each node 202 is reachable from any of the other nodes.

As illustrated in FIG. 2B, upon startup of the nodes 202, the master node mechanism 204 of each node 202 may allow the nodes 202 to self-organize into a group 220 of nodes without human intervention. Group 220 may represent a group, cluster, grid, subnetwork, or any organization of nodes on a network. The nodes 202 in the group 220 may cooperate to self-elect a master node for the group. In one embodiment, to self-elect a master node, each node 202, upon startup, may attempt to discover another node 202 that is already designated as master node for the group 220. If the node 202 discovers no master nodes, the node 202 assumes the role of master node, and replies to any queries from the other nodes 202 that it has self-designated as master node for the group 220. In this example, node 202A has been elected as the master node for the group. If there are any collisions, that is if two or more nodes 202 self-designate as master node, the nodes 202 may cooperate to determine which of the nodes 202 is to be designated as the master node.

Once the nodes 202 form group 220, the nodes 202 may perform dynamic fault detection to detect if the master node (node 202A, in this example). If the nodes 202 detect that the master node for the group has become unavailable for any reason, one of the other nodes 202 assumes the role of master node.

Group 220 may be formed as an autonomous network or group to perform any function of a group of nodes on a network where one (or more) nodes are needed or desired to serve as master nodes. Each node 202 may include additional hardware and/or software that is part of an application or service that the group of nodes are intended to implement or provide on a network. Examples of such functions include, but are not limited to, application server clusters and grid computing networks. In the former, one (or more) nodes may serve as master nodes to perform tasks such as load balancing and failover for the cluster of application servers. In the latter, one node may serve as the master node to perform as a job submitter that submits jobs and/or tasks (portions of jobs) to other "slave" nodes in the grid. Another example of a possible application for such self-organizing groups is in monitoring applications where information about or gathered by a group of nodes needs to be submitted to a control or monitoring node, or control station. In this example, the master node may serve as the interface between the group of nodes and the control station, collecting information to be submitted to the control station from the other nodes in the group and providing the information to the control station. Yet other exemplary applications may include servers providing a directory service and a distributed database.

One exemplary application for embodiments is in installing collections of nodes to perform or provide some function, application or service as a group, for example as an application server cluster, as a grid computing system, or as a distributed database. In one embodiment, each node may be preconfigured with an instance of the master node mechanism and hardware and/or software for providing or performing the function, application or service of the group. Each node may also be preconfigured with one or more virtual endpoints for communicating with other nodes in the collection. Upon installation on a network and startup, each node may broadcast a discovery query for other nodes in the group, and/or broadcast a discovery query for a node that has assumed the role of master node in the group. If no response to the query for a master node is received, the broadcasting node may assume the role of master node and broadcast a notification to the other nodes in the group indicating that it has self-elected as master node for the group. If one or more other nodes have also self-elected as master nodes, then the nodes enter negotiation to elect one of the nodes to serve as master nodes. The other nodes return to the role of slave nodes to the elected master node. The self-organized group of nodes may then perform or provide the application, service or function for which the nodes were preconfigured. The master node may serve as a central point to provide or control one or more functions for the nodes in the group, such as load balancing or failover. After a master node is selected, the nodes in the group may monitor the master node and, if the master node goes down for any reason, one of the other nodes may assume the role of master node for the group. Again, collisions may occur where two or more nodes detect the master node failure and assume the role of master node, in which case the nodes may negotiate to elect one of the nodes as the new master node.

FIGS. 3A through 3G illustrate an exemplary collection of nodes implementing a master node mechanism according to one embodiment. Two or more nodes 202 may be installed on a network 200, or interconnected to form a network of nodes, via wired or wireless network interfaces. The nodes 202 may be intended to interoperate as a group of nodes to perform some application or provide some service, for example to serve as a cluster of application servers or as a grid computing system. Each of the nodes 202 may include an instance of a master node mechanism 204 and software and/or hardware for performing the application or service, represented by application 206. In FIGS. 3A through 3G, the master node mechanism 204 and application 206 are only shown for node 202A, but each node 202B through 202D may include its own instance of master node mechanism 204 and application 206. Note that application 206 is not necessarily identical for each node. Also note that, in one embodiment, master node mechanism 204 may be implemented as a module in application 206 and not as a separate entity as it is illustrated in FIGS. 3A through 3G. Further, each node may include two or more applications 206 that utilize the master node mechanism 204. Also note that there may be one or more other nodes on the network that are not participating directly in the group of nodes, and thus do not participate in the master node selection process described below.

Figure 3A:
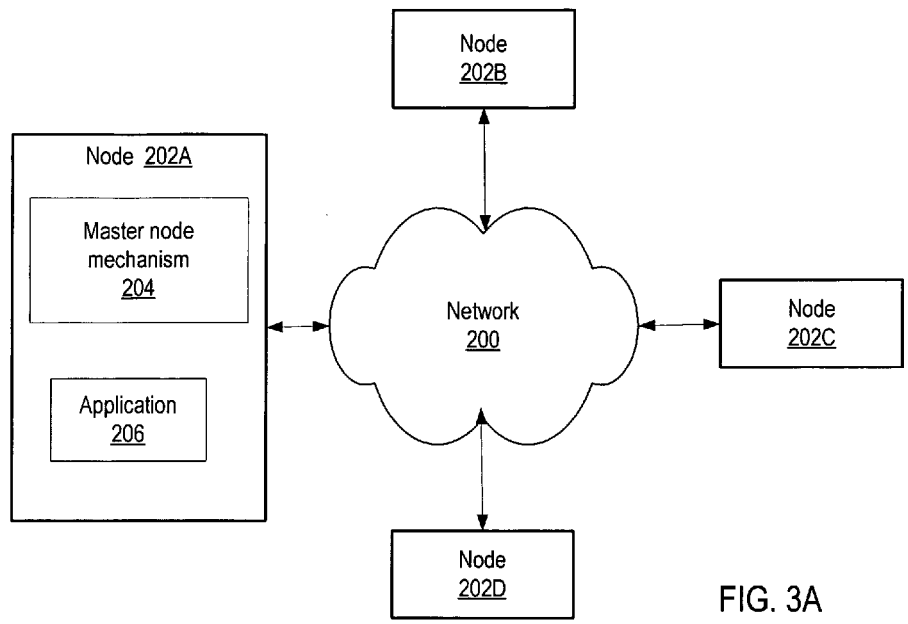
FIGS. 3A through 3G illustrate an exemplary collection of nodes implementing a master node mechanism according to one embodiment.
Figure 3B:
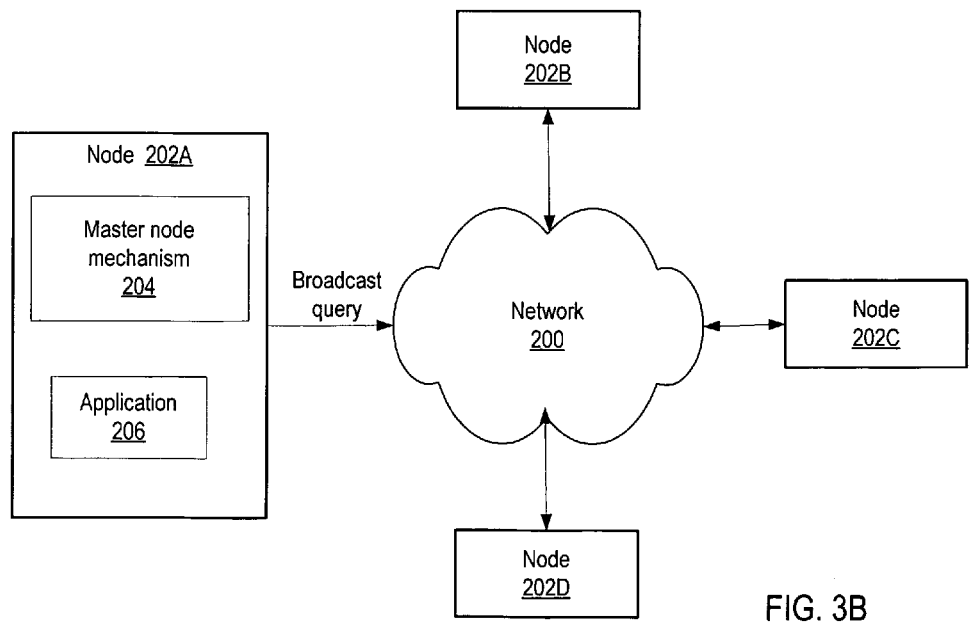
Figure 3C:
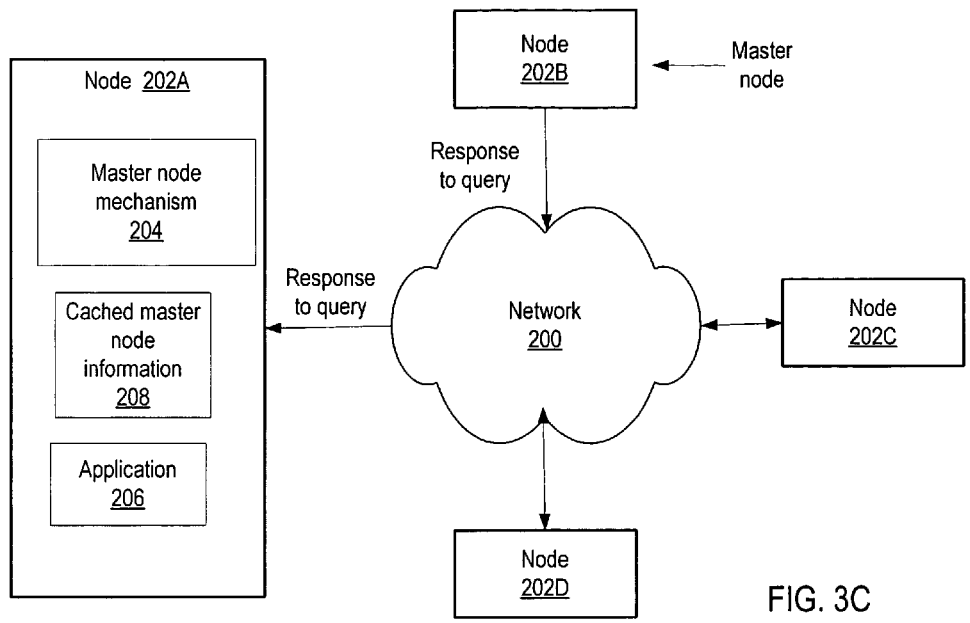
Figure 3D:
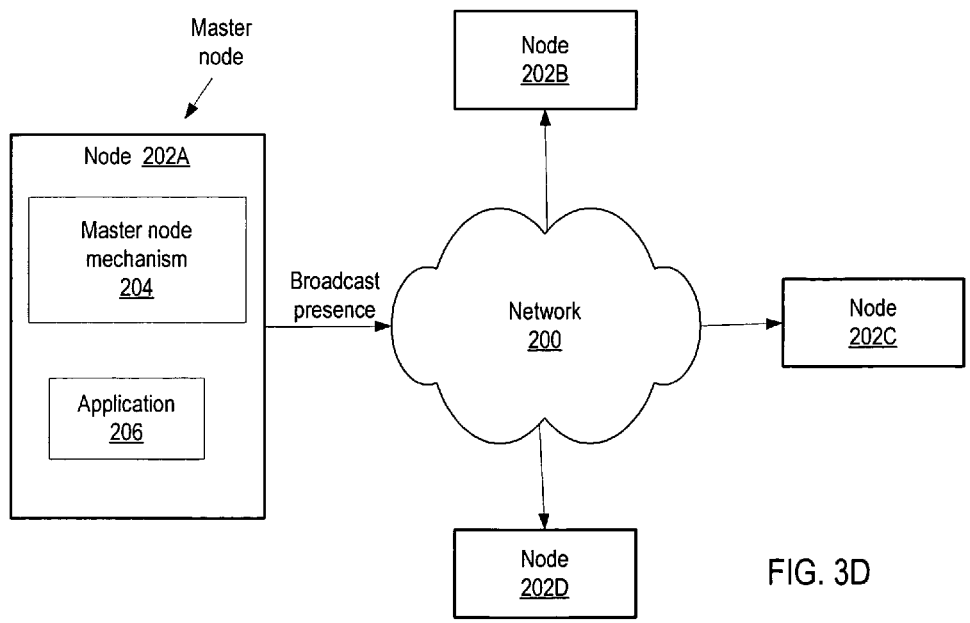

Upon startup, each of the nodes 202 may perform master node discovery. In one embodiment, through predefined virtual endpoints, a node (for example, node 202A) may broadcast a query for a master node on the network 200, or within a group of nodes 202 on the network or within a subnetwork on the network. FIG. 3B illustrates node 202A broadcasting a query searching for a master node on the network 200 according to one embodiment. As illustrated in FIG. 3C, if a master node is discovered, for example if node 202B responds that it has self-designated as master node, the node 202A may cache the information 208 about the master node for future use. As illustrated in FIG. 3D, if the query for a master node produces no responses within a specified period, the querying node 202A may assume master node responsibilities for the group; in other words, the node 202A may designate itself as the master node for the group of nodes 202 within the scope of which the query was broadcast. The node 202A may then broadcast its presence on the network or within the group as the master node. Other nodes 202 within the group that receive this broadcast may cache this information for future use.

Figure 3E:
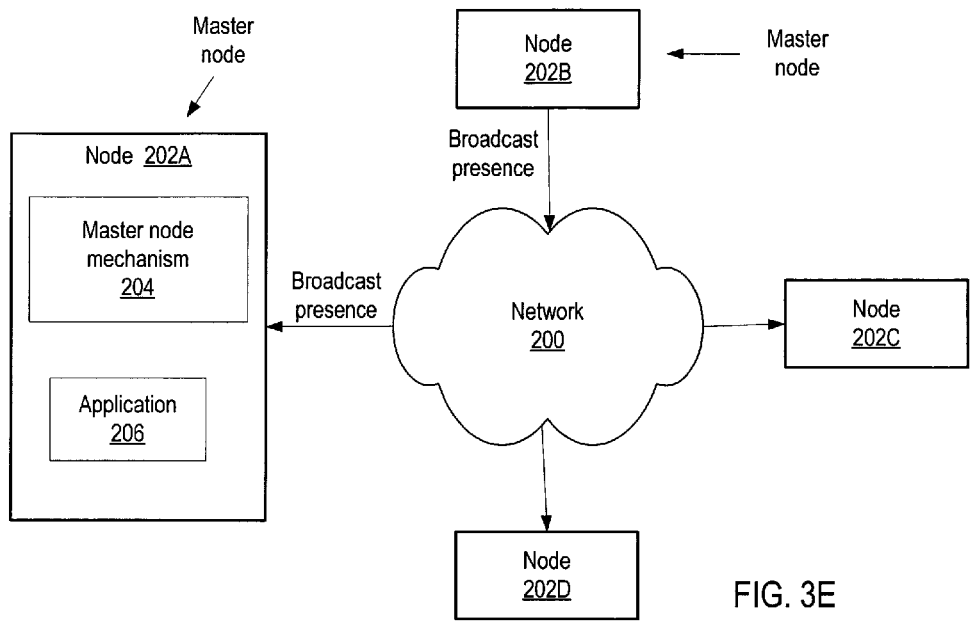
Figure 3F:
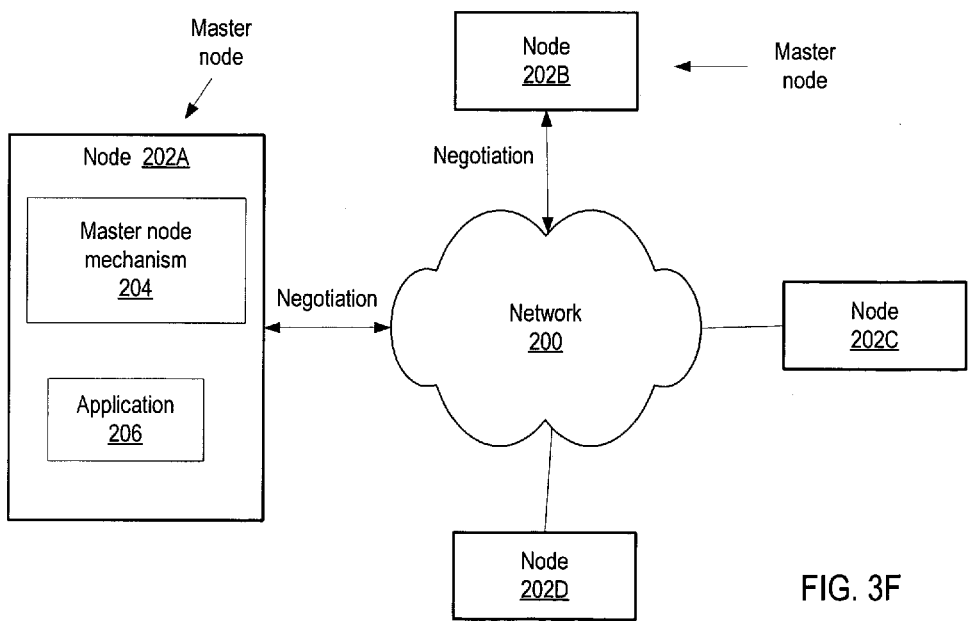
Figure 3G:
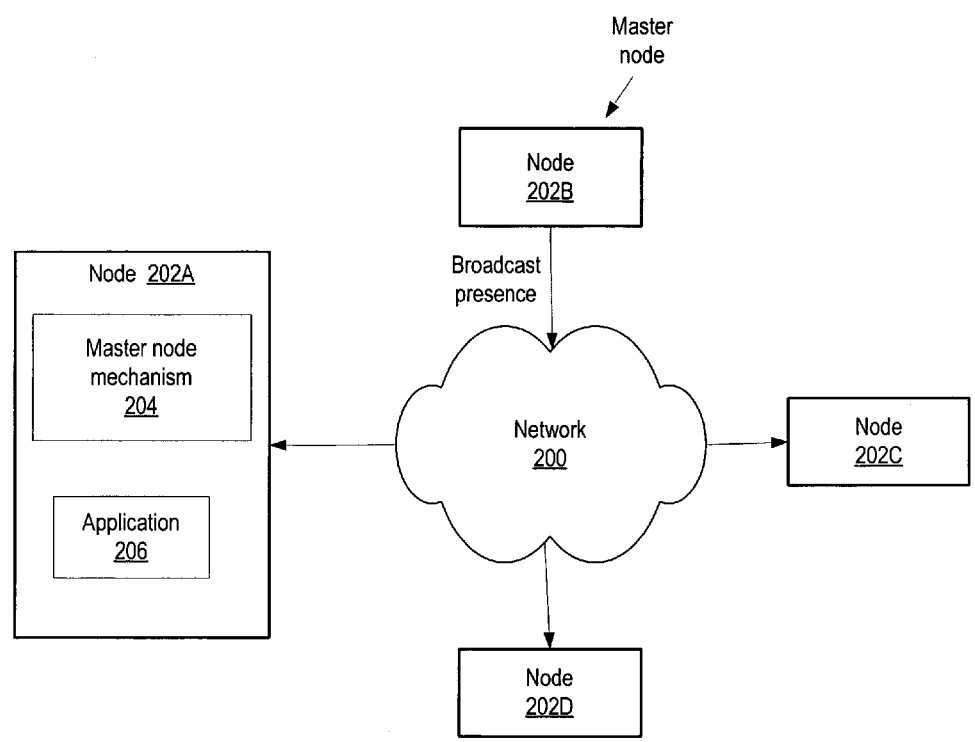

It is possible that two or more nodes 202 within the group of nodes may self-designate as master nodes. In one embodiment, each self-designated master node may wait for a specified period for any broadcast from other possible self-elected master nodes. For example, after broadcasting its presence as master node, node 202A may wait to see if any other nodes respond as master nodes. FIG. 3E illustrates node 202A, self-designated as a master node, receiving a broadcast message from node 202B announcing that it has self-designated as a master node, according to one embodiment. If a broadcast or broadcasts indicating that one or more other nodes 202 have self-designated as master nodes is received, the master nodes may enter a negotiation to determine which node 202 will be the master node for the group. FIG. 3F illustrates nodes 202A and 202B negotiating to determine which node will be master node. The node 202 that is selected to be the master node may then broadcast a message indicating that it is the master node for the group. In FIG. 3G, node 202B has been selected via negotiation with master node 202A to be the master node for the group, and broadcasts a message to the group of nodes announcing its presence as master node. Note that other nodes 202 may already have cached information about which node is the master node, and may thus update the information to indicate that node 202B is now the master node.

After this startup process in which each node 202 in the group broadcasts messages querying for a master node within the group, caching information on the master node if a response to the query is received or alternatively self-designating as master node if no response is received, and cooperating with other nodes 202 to resolve collisions if two or more nodes self-designate as master nodes, the group of nodes 202 is ready to perform its intended function.

Figure 4A:
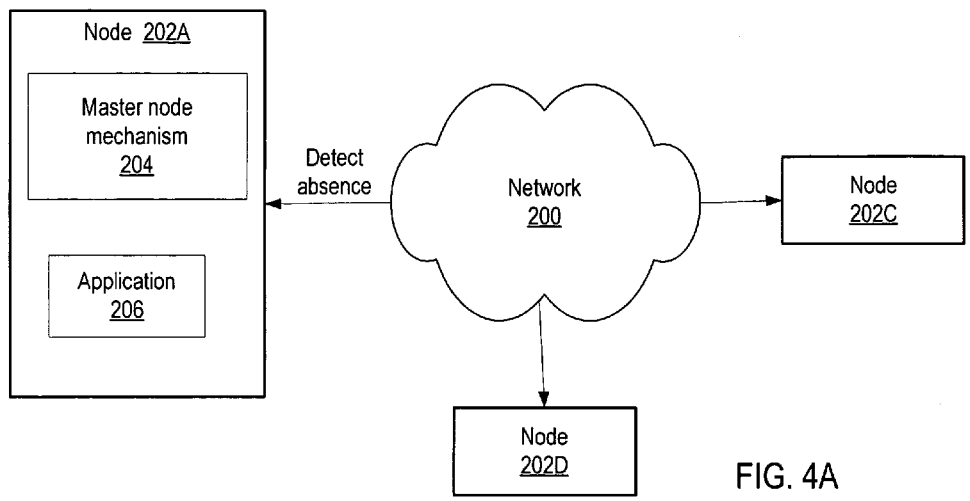
FIGS. 4A and 4B illustrate a mechanism for recovering from the failure of a master node within an exemplary group of nodes according to one embodiment.
Figure 4B:
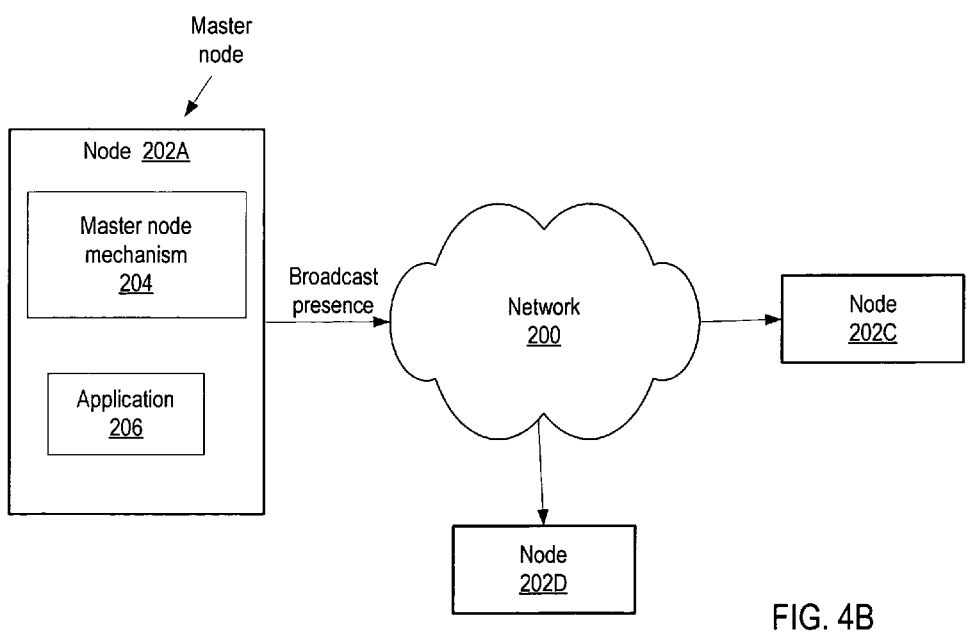

FIGS. 4A and 4B illustrate a mechanism for recovering from the failure of a master node within an exemplary group of nodes according to one embodiment. If the master node for a group of nodes becomes unavailable, one or more of the other nodes within the group may detect the absence of the master node, for example through periodic or aperiodic polling of the master node or through a failure of the master node to respond to a message during normal operations. Alternatively, a master node may broadcast a message within the group announcing that it is going to become unavailable before going offline. In FIG. 4A, node 202A has detected the failure of node 202B, which was the master node for the group of nodes illustrated in FIG. 3G. Upon detecting failure of the master node, the nodes 202 in the group may go through a similar process as that described above to determine a new master node for the group. In FIG. 4B, node 202A has self-designated as master node for the group and broadcast its presence to the other nodes in the group. The other nodes 202 may then update their cached master node information. Collisions where two or more nodes self-elect as master nodes, if any, may be detected and resolved as was described in FIGS. 3E and 3F.

Figure 5A:
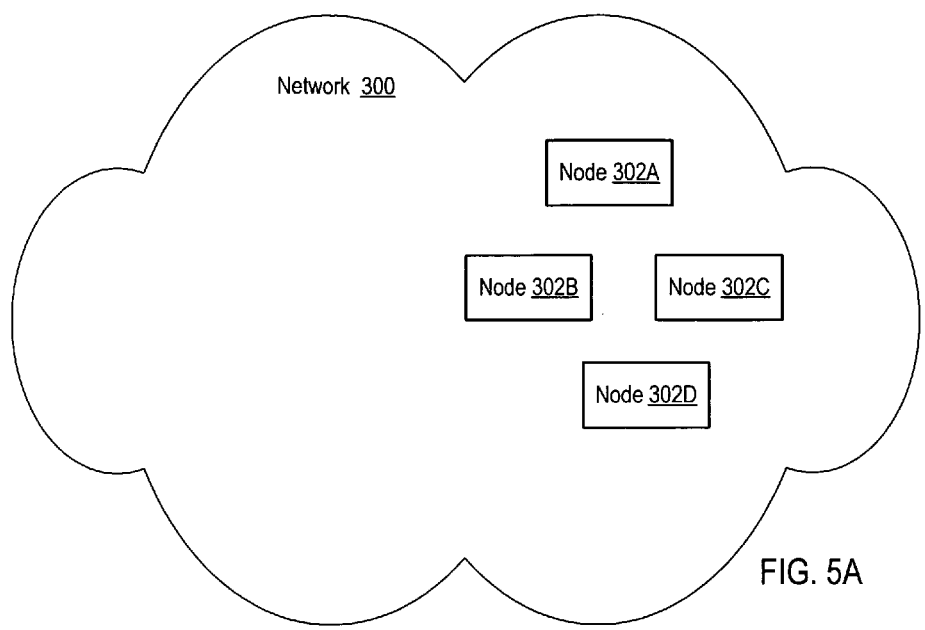
FIGS. 5A through 5C illustrate installing a collection of nodes on a network and the nodes self-organizing into a group for performing some function on the network according to one embodiment.
Figure 5B:
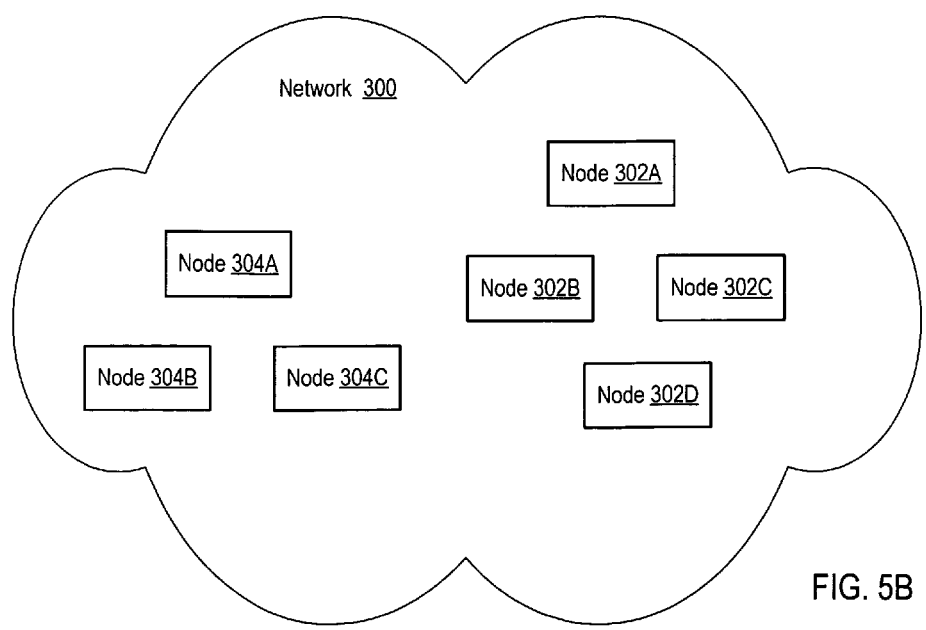
Figure 5C:
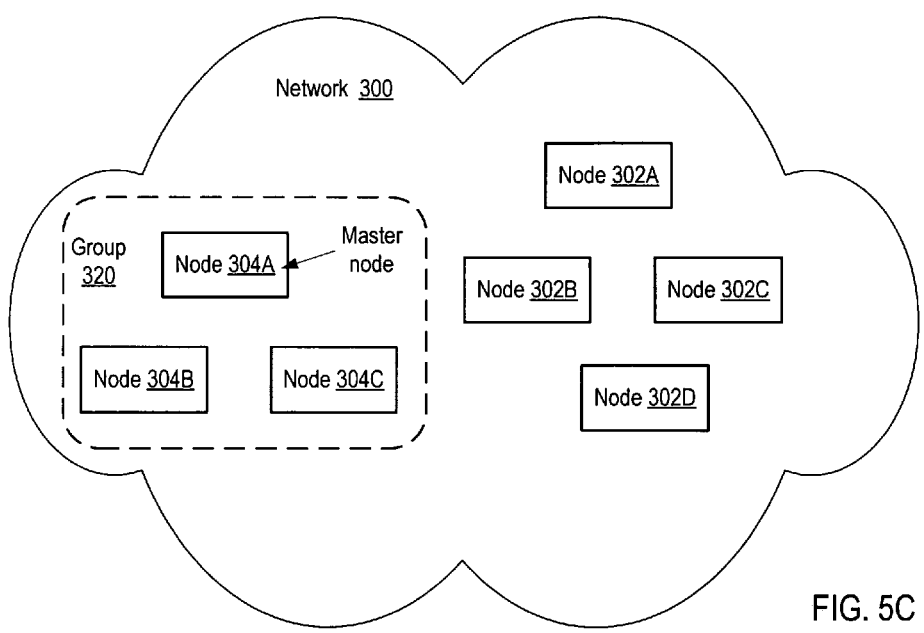

FIGS. 5A through 5C illustrate installing a collection of nodes on a network and the nodes self-organizing into a group, or subnetwork, for performing some function on the network according to one embodiment. In FIG. 5A, a network 300 may include two or more nodes 302. In FIG. 5B, a collection of nodes 304, each including an instance of a master node mechanism as describe herein, may be installed on the network 300. As illustrated in FIG. 5C, upon startup, the nodes 304 may self-organize into a group 320 of nodes, and may self-elect a master node for the group 320. In this example, node 304A has been designated the master node for the group 320.

Embodiments may be used in any application where there is a need for some organization of two or more nodes into groups with a master node for load balancing, failover, data collection, or any other purpose. The collection of nodes 304 may, for example, be application servers, such as application servers that provide a directory service. A collection of these servers, when installed on the network 300, may use the master node mechanism to self-organize, discover a view of the network 300, elect a single master node that is responsible for all the other nodes for directing failover, directing queries for load balancing or other purposes, data replication, etc. As another example, the collection of nodes 304 may be nodes intended to self-organize into a grid to perform grid computing jobs. In a grid, the master node may serve as the job distributor or dispatcher that aggregates submitted jobs and distributes the jobs to the slave nodes.

Figure 6:
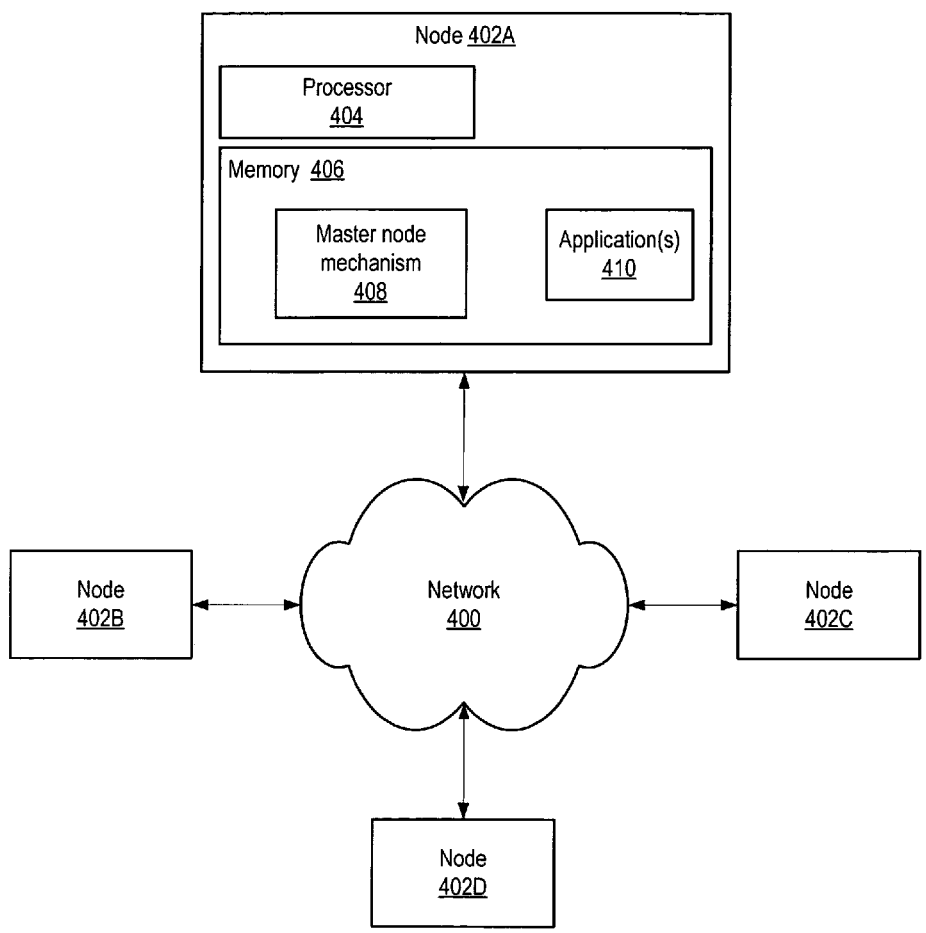
FIG. 6 illustrates a node hosting a master node mechanism according to one embodiment.

FIG. 6 illustrates a node hosting a master node mechanism according to one embodiment. Node 402A may be any of various types of devices, including, but not limited to, a personal computer system, desktop computer, laptop or notebook computer, mainframe computer system, workstation, network computer, Personal Digital Assistant (PDA), or other suitable device. In general, node 402A may be any device with a digital heartbeat. Node 402A may include at least one processor 404. The processor 404 may be coupled to a memory 406. Memory 406 is representative of various types of possible memory media, also referred to as "computer readable media" or "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Node 402A may couple over a network or networks to one or more other devices or nodes via one or more wired or wireless network interfaces.

Node 402A may include, in memory 406, an instance of a master node mechanism 408 and an application 410. One or more other nodes 402 including instances of the master node mechanism may be installed on network 400, or interconnected to form a network of nodes, via wired or wireless network interfaces. The nodes 402 may be intended to interoperate as a group of nodes to perform some application or provide some service, for example to serve as a cluster of application servers or as a grid computing system. Each of the nodes 402 may include an instance of the master node mechanism 408 and software and/or hardware for performing the application or service, represented by application 410 on node 402A. Note that application 410 is not necessarily identical for each node. Also note that, in one embodiment, master node mechanism 408 may be implemented as a module in application 410 and not as a separate entity as it is illustrated in node 402A. Further, node 402A may include two or more applications 410 that may utilize the master node mechanism 408. Also note that there may be one or more other nodes on the network that are not participating directly in the group of nodes, and thus do not participate in the master node selection process described herein.

Upon startup, node 402A may perform master node discovery. In one embodiment, through predefined virtual endpoints, node 402A may broadcast a query for a master node on the network 400, or within a group of nodes 402 on the network or within a subnetwork on the network. If a master node is discovered, for example if node 402B responds that it has self-designated as master node, the node 402A may cache the information about the master node for future use. If the query for a master node produces no responses within a specified period, the querying node 402A may assume master node responsibilities for the group; in other words, node 402A may designate itself as the master node for the group of nodes 402 within the scope of which the query was broadcast. The node 402A may then broadcast its presence on the network or within the group as the master node. Other nodes 402 within the group that receive this broadcast may cache this information for future use.

It is possible that two or more nodes 402 within the group of nodes may self-designate as master nodes. In one embodiment, each self-designated master node may wait for a specified period for any broadcast from other possible self-elected master nodes. For example, after broadcasting its presence as master node, node 402A may wait to see if any other nodes respond as master nodes. If a broadcast or broadcasts indicating that one or more other nodes 402 have self-designated as master nodes is received, the master nodes may enter a negotiation to determine which node 402 will be the master node for the group. If node 402A is selected to be the master node, it may then broadcast a message indicating that it has been elected the master node for the group.

After this startup process in which node 402A broadcasts a message querying for a master node within the group, caching information on the master node if a response to the query is received or alternatively self-designating as master node if no response is received, and cooperating with other nodes 402 to resolve collisions if two or more nodes self-designate as master nodes, the group of nodes 402 is ready to perform the intended function(s) of application 410.

Figure 7:
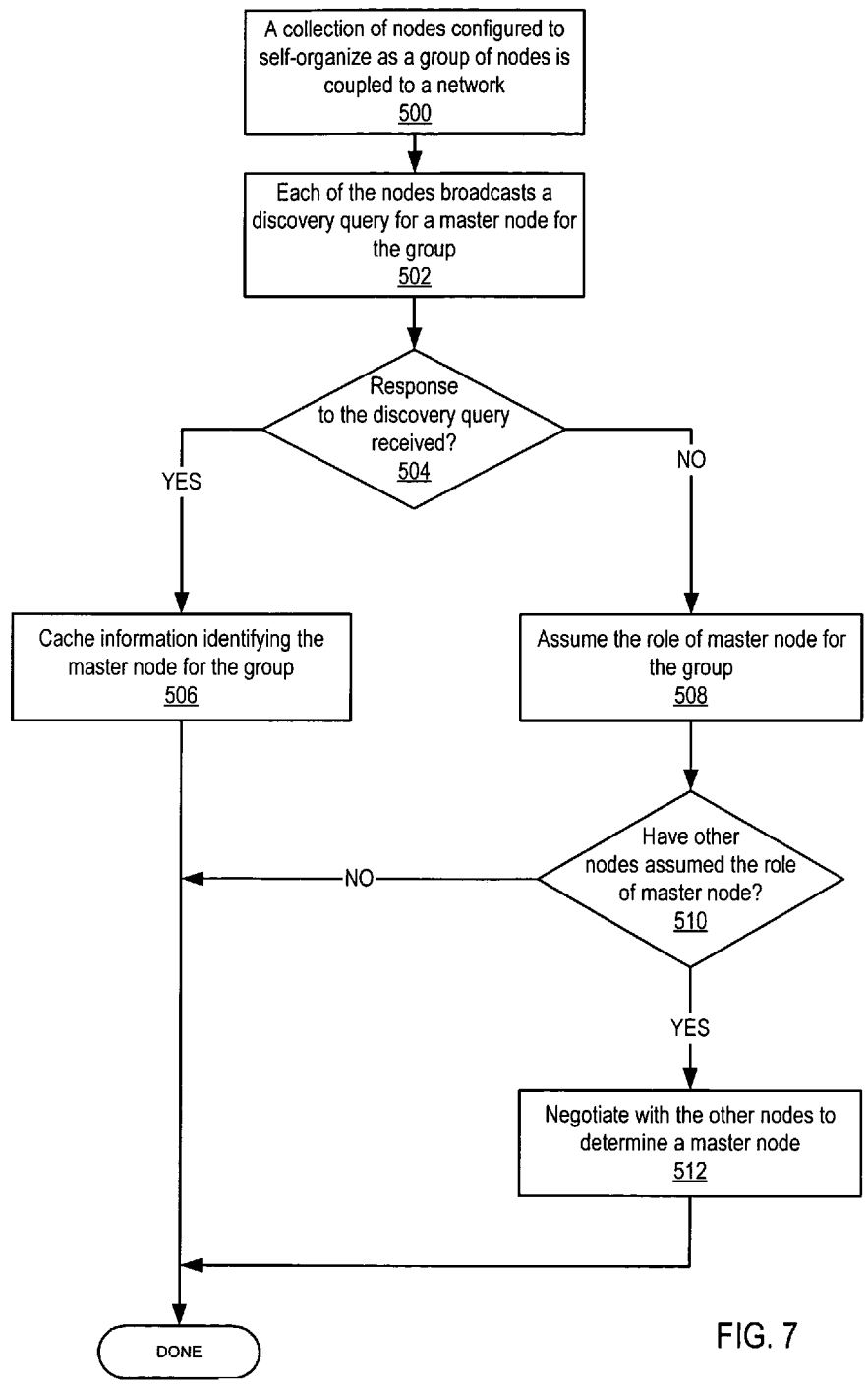
FIG. 7 is a flowchart illustrating a method for the self-organization of a collection of nodes into a group and the self-election of a master node for the group according to one embodiment.

FIG. 7 is a flowchart illustrating a method for the self-organization of a collection of nodes into a group and the self-election of a master node for the group according to one embodiment. As indicated at 500, a collection of nodes each configured to self-organize as a group of nodes is coupled to a network. Each node may include an instance of the master node mechanism and hardware and/or software for performing one or more applications of the group. In one embodiment, each node may also be preconfigured with one or more virtual endpoints for communicating with the other nodes in the group. As indicated at 502, upon startup, each of the nodes may broadcast a discovery query for a master node for the group. At 504, if a response to the discovery query is received from another node, then the querying node may cache information identifying the responding node as the master node for the group, as indicated at 506. If no response to the discovery query is received, then the querying node may assume the role of master node for the group, as indicated at 508. The node may then broadcast a message indicating that it has assumed the role of master node to the group. The master node may serve as a central point to provide or control one or more functions for the nodes in the group.

It is possible that two or more of the nodes in the group may assume the role of master node. At 510, if two or more nodes have assumed the role of master node, then the nodes may negotiate to determine one of the nodes to serve as the master node, as indicated at 512. In one embodiment, after self-electing as master node, a node may wait for a specified period for messages broadcast from other nodes indicating they have self-elected as master nodes. If the node receives one or more such messages, then the node may communicate with the other nodes that have self-elected as master nodes to determine which node is to be the master node.

In one embodiment, the group of nodes may be peer nodes in a peer-to-peer networking environment on the network. The peer-to-peer networking environment may be implemented according to a peer-to-peer platform. In one embodiment, the peer-to-peer platform is JXTA. In a peer-to-peer networking environment, the group of nodes may be peer nodes in a peer group on the network, and the scope of broadcasting discovery messages and queries may be defined by the peer group. In one embodiment, the peer group is a JXTA peer group. In JXTA, the peer group may extend across two or more subnetworks on the network.

Figure 8:
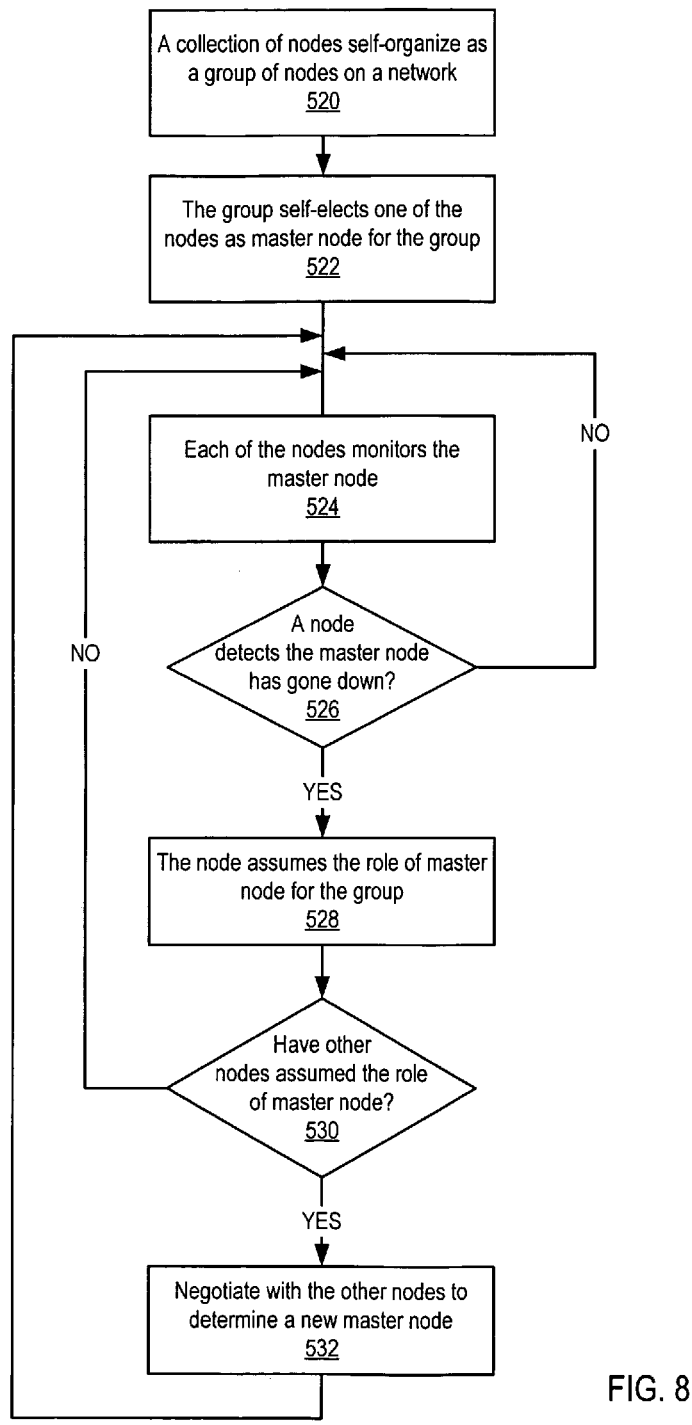
FIG. 8 is a flowchart illustrating a method for a self-organized group of nodes to self-elect a new master node for the group if the master node goes down according to one embodiment.

FIG. 8 is a flowchart illustrating a method for a self-organized group of nodes to self-elect a new master node for the group if the master node goes down according to one embodiment. A collection of nodes may self-organize as a group of nodes on a network as indicated at 520, and the group may self-elect one of the nodes as master node for the group as indicated at 522. FIG. 7 describes an exemplary method for performing 520 and 522.

After the nodes have self-organized into a group and have self-elected one of the nodes as the master node for the group, each of the nodes may monitor the status of the master node, as indicated at 524. At 526, if a node detects that the master node has gone down, the node assumes the role of master node for the group as indicated at 528. Any of several mechanisms may be used to detect master node failure. In one embodiment, the master node may broadcast a message indicating that it is going down. In one embodiment, the nodes in the group may poll the master node to detect master node failure. In one embodiment, a node may detect that the master node is down when trying to communicate with the master node during normal group operations. One or more of these mechanisms may be used in combination, or other mechanisms may be used.

It is possible that two or more of the nodes in the group may detect that the master node is down and assume the role of master node. At 530, if two or more nodes have assumed the role of master node, then the nodes may negotiate to determine one of the nodes to serve as the new master node, as indicated at 532.

Peer-to-Peer Platform Implementation

Sun Microsystems's JXTA™ is an exemplary peer-to-peer platform that provides a virtual network overlay on top of the Internet, allowing peers to directly interact and self-organize independently of their network connectivity and domain topology (e.g. firewalls and/or NATs). As previously mentioned, embodiments of the master node mechanism may be implemented in JXTA™ networking environments. Other embodiments may be implemented on other peer-to-peer platforms. The underlying peer-to-peer platform may provide one or more underlying tools, formats, protocols, and/or mechanisms, such as pipes, that may be leveraged to provide self-organizing groups of nodes with self-elected master nodes, as described herein, in peer-to-peer network computing environments.

An embodiment implemented using the JXTA platform, for example, may rely on JXTA peer groups as the scope for discovery and queries. JXTA peer groups are not limited to a subnetwork on the network, but may extend across subnetworks using the JXTA communication mechanisms (pipes) and protocols; therefore, the scope of the master node mechanism implemented on top of the JXTA platform is not limited to subnetworks. Nodes can self-organize as groups of nodes and self-elect a master node, as described herein, across subnetworks on a network using the JXTA platform.

An embodiment implemented on the JXTA peer-to-peer platform may use one or more JXTA protocols as mechanisms by which the nodes communicate to elect a master node. One embodiment may use JXTA propagation, a propagated pipe, within the scope of a peer group to determine which node from all the nodes within the scope of the peer group is the master node for a particular application, service, or function to be provided by or within the peer group.

Note that not all nodes that are participating as member peers within a peer group are necessarily part of a group of nodes that self-organize as an autonomous network or group using the master node mechanism as described herein. For example, a peer group may include ten nodes, and from two to all ten of the nodes may self-organize as a node group with a master node to perform or provide some application, function or service within the peer group or on the network including the peer group using an embodiment of the master node mechanism as described herein. Note also that embodiments of the master node mechanism may be used to organize subgroups of the nodes within the peer group, which may include two or more of the nodes in the peer group, as groups of nodes and to determine master nodes for each of the groups within the peer group as groups of nodes each with a master node to perform or provide different applications, functions or services. These groups within a peer group may overlap; that is, a node may belong to more than one group. Also note that one node may serve as a master node for more than one node group.

The nodes do not have to be already organized as a JXTA peer group to use the master node mechanism. A collection of nodes may be installed and self-organize as a JXTA peer group, using the master node mechanism to self-elect one or more nodes to serve as the master node(s) for one or more applications, services, or functions of the peer group.

Figure 9:
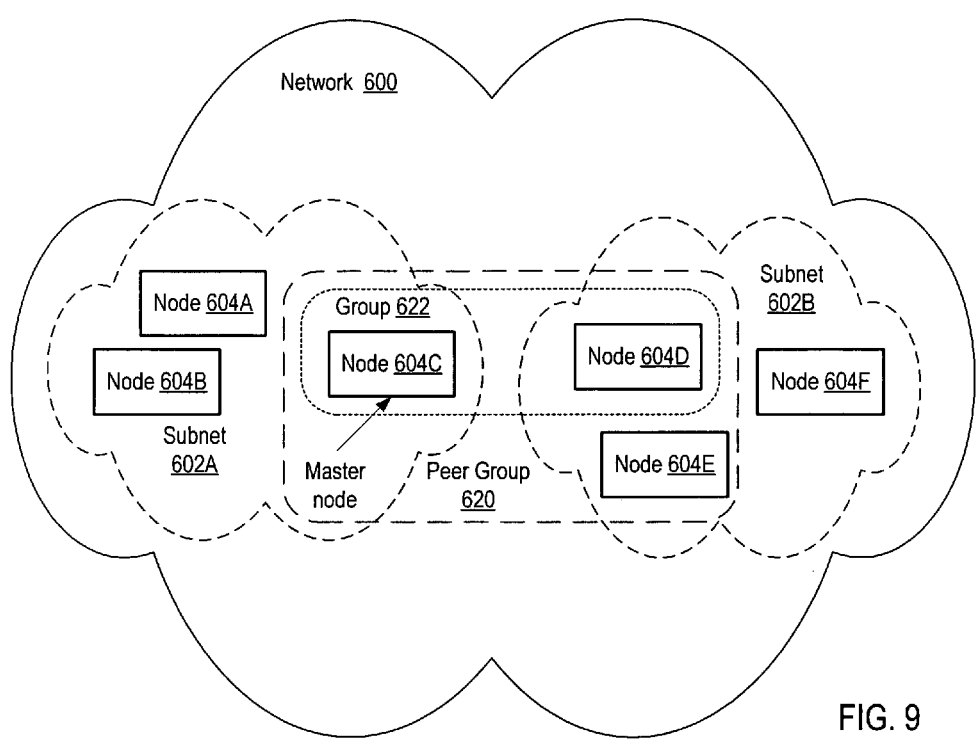
FIG. 9 illustrates a peer-to-peer platform implementation where a peer group serves as the scope for self-organization of node groups and self-election of master nodes according to one embodiment.

FIG. 9 illustrates a peer-to-peer platform implementation where a peer group serves as the scope for self-organization of node groups and self-election of master nodes according to one embodiment. In one embodiment, the peer-to-peer platform may be the JXTA peer-to-peer platform. A network 600 may include two or more subnetworks, or subnets, 602. One or more nodes 604 within different subnets 602 may use the peer-to-peer platform to form a peer group 620 that spans the subnets 602. The nodes 604 within the peer group may use an embodiment of the master node mechanism as described herein to form one or more groups 622 of nodes 604 within the peer group 620 each of which may include two or more of the nodes within the peer group 620, and to self-elect master node(s) for the group(s). The peer group 620 serves as the scope for queries for the master node mechanism. In this example, nodes 604C, 604D, and 604E form a peer group 620, and nodes 604C and 604D have formed a group 622 with node 604C as the maser node within the peer group 620. Note that a group 622 may include two or more, or all, of the nodes 604 within peer group 620, that there may be one or more groups 622 within a peer group, that the groups 622 may overlap, and that a node 604 may serve as a master node for more than one group 622.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A network computing system, comprising:
a plurality of devices coupled to a network, wherein each device comprises one or more nodes;
two or more of the nodes configured to couple to the network and to self-organize as a group on the network to perform one or more applications on the network;
wherein, to self-organize as a group on the network, each of the two or more nodes is configured to:
broadcast a discovery query for a master node for the group on the network;
if a response to the discovery query is received indicating another node as the master node for the group, cache information indicating that the other node is the master node for the group; and
if no response to the discovery query is received, assume the role of master node for the group;
wherein the master node for a group is configured to provide or control one or more functions for nodes in the group; and
wherein the two or more nodes are peer nodes in a peer-to-peer networking environment on the network, wherein the peer-to-peer networking environment is implemented according to a peer-to-peer platform comprising one or more peer-to-peer platform protocols for enabling peer nodes to discover each other, communicate with each other, and cooperate with each other to form peer groups and share content in the peer-to-peer networking environment.

2. The network computing system as recited in claim 1, wherein, if a node assumes the role of master node for the group, the node is configured to broadcast on the network that the node has assumed the role of master node for the group.

3. The network computing system as recited in claim 1, wherein, if two or more of the nodes in the group assume the role of master node for the group, the nodes that have assumed the role of master node for the group are configured to negotiate to determine one of the nodes to serve as the master node for the group.

4. The network computing system as recited in claim 1, wherein the two or more nodes in the group are configured to, if the master node for the group goes down:
detect that the master node has become unavailable; and
select one of the nodes to assume the role of master node for the group.

5. The network computing system as recited in claim 1, wherein the two or more nodes are peer nodes in a peer group on the network, wherein scope of said broadcast is the peer group, and wherein the peer group is implemented in accordance with the peer-to-peer platform.

6. The network computing system as recited in claim 5, wherein the peer group extends across two or more subnetworks on the network.

7. A network computing system, comprising:
a network;
a plurality of devices coupled to the network; and
a plurality of nodes implemented on the plurality of devices, wherein the plurality of nodes is configured to:
couple to the network and to self-organize as a node group on the network to perform one or more functions on the network; and
determine one of the plurality of nodes to serve as a master node for the group;
wherein the master node for a group is configured to provide or control one or more functions for nodes in the group; and
wherein, to determine one of the plurality of nodes to serve as a master node for the group, each of the nodes is configured to:
broadcast a discovery query for a master node for the group on the network;
if a response to the discovery query is received indicating another node as the master node for the group, cache information indicating that the other node is the master node for the group; and
if no response to the discovery query is received, assume the role of master node for the group;
wherein the plurality of nodes are peer nodes in a peer group on the network, wherein scope of said broadcast is the peer group, and wherein the peer group is implemented in accordance with a peer-to-peer platform comprising one or more peer-to-peer platform protocols for enabling peer nodes to discover each other, communicate with each other, and cooperate with each other to form peer groups and share content in a peer-to-peer networking environment.

8. The network computing system as recited in claim 7, wherein, if a node assumes the role of master node for the group, the node is configured to broadcast on the network that the node has assumed the role of master node for the group.

9. The network computing system as recited in claim 7, wherein, if two or more of the nodes in the group assume the role of master node for the group, the nodes that have assumed the role of master node for the group are configured to negotiate to determine one of the nodes to serve as the master node for the group.

10. The network computing system as recited in claim 7, wherein the peer group extends across two or more subnetworks on the network.

11. The network computing system as recited in claim 7, wherein the plurality of nodes are further configured to, if the master node for the group goes down:
detect that the master node has become unavailable; and
determine another one of the plurality of nodes to assume the role of master node for the group.

12. A system, comprising:
a processor; and
a memory comprising program instructions, wherein the program instructions are executable by the processor to implement a master node mechanism configured to:
broadcast a discovery query on a network for a master node for a group of nodes on the network, wherein the group of nodes is configured to perform one or more applications on the network, wherein the system is configured as a node in the group;
if a response to the discovery query is received indicating another node as the master node for the group, store information indicating that the other node is the master node for the group; and
if no response to the discovery query is received, self-elect the system as master node for the group;

wherein, the master node for a group is configured to provide or control one or more functions for nodes in the group; and wherein the group of nodes are peer nodes in a peer-to-peer networking environment on the network, wherein the peer-to-peer networking environment is implemented according to a peer-to-peer platform comprising one or more peer-to-peer platform protocols for enabling peer nodes to discover each other, communicate with each other, and cooperate with each other to form peer groups and share content in the peer-to-peer networking environment.

13. The system as recited in claim 12, wherein, if the master node mechanism self-elects the system as the master node for the group, the master node mechanism is configured to broadcast the system's presence as master node for the group.

14. The system as recited in claim 12, wherein, if the master node mechanism self-elects the system as the master node for the group, and if one or more other nodes also self-elect as master nodes for the group, the master node mechanism is further configured to negotiate with the other nodes that have self-elected as master nodes to determine which one of the nodes is to serve as the master node for the group.

15. The system as recited in claim 12, wherein, if another node in the group is the master node for the group, and if that other node becomes unavailable, the master node mechanism is further configured to:
   detect that the master node has become unavailable; and
   self-elect the system to assume the role of master node for the group.

16. The system as recited in claim 12, wherein the group of nodes are peer nodes in a peer group on the network, wherein scope of said broadcast is the peer group, and wherein the peer group is implemented in accordance with the peer-to-peer platform.

17. The system as recited in claim 16, wherein the peer group extends across two or more subnetworks on the network.

18. A network computing system, comprising:
   means for a collection of nodes to self-organize as a group of nodes on a network to perform one or more applications on the network; and
   means for the group of nodes to determine one of the nodes to serve as master node for the group, wherein, the master node for the group is configured to provide or control one or more functions for the nodes in the group;
   wherein said means for the group of nodes to determine one of the nodes to serve as master node for the group comprises:
      means for each of the nodes to self-elect as the master node for the group; and
      if two or more of the nodes self-elect as the master node for the group, means for the two or more nodes to negotiate to select one of the nodes in the group as the master node for the group;
   wherein the collection of nodes are peer nodes in a peer-to-peer networking environment on the network, wherein the peer-to-peer networking environment is implemented according to a peer-to-peer platform comprising one or more peer-to-peer platform protocols for enabling peer nodes to discover each other, communicate with each other, and cooperate with each other to form peer groups and share content in the peer-to-peer networking environment.

19. The network computing system as recited in claim 18, further comprising means for the group of nodes to determine a new master node for the group if the master node for the group goes down.

20. A method, comprising:
   a node broadcasting a discovery query on a network for a master node for a group of nodes on the network configured to perform one or more applications on the network;
   if a response to the discovery query is received indicating another node as the master node for the group, storing information indicating that the other node is the master node for the group; and
   if no response to the discovery query is received, the node assuming the role of master node for the group;
   wherein, the master node for the group is configured to provide or control one or more functions for the nodes in the group; and
   wherein the group of nodes are peer nodes in a peer-to-peer networking environment on the network, wherein the peer-to-peer networking environment is implemented according to a peer-to-peer platform comprising one or more peer-to-peer platform protocols for enabling peer nodes to discover each other, communicate with each other, and cooperate with each other to form peer groups and share content in the peer-to-peer networking environment.

21. The method as recited in claim 20, wherein the method further comprises, if the node assumes the role of master node for the group, broadcasting the node's presence as master node for the group.

22. The method as recited in claim 20, wherein the method further comprises, if the node assumes the role of master node for the group, and if one or more other nodes also self-elect as master nodes for the group, the node negotiating with the other nodes that have self-elected as master nodes to determine which one of the nodes is to serve as the master node for the group.

23. The method as recited in claim 20, wherein the method further comprises, if another node in the group is the master node for the group, and if that other node becomes unavailable:
   the node detecting that the master node has become unavailable; and
   the node assuming the role of master node for the group.

24. The method as recited in claim 20, wherein the group of nodes are peer nodes in a peer group on the network, wherein the scope of said broadcasting is the peer group, and wherein the peer group is implemented in accordance with the peer-to-peer platform.

25. The method as recited in claim 24, wherein the peer group extends across two or more subnetworks on the network.

26. A computer-accessible storage medium storing program instructions, wherein the program instructions are computer-executable to implement:
   a node broadcasting a discovery query on a network for a master node for a group of nodes on the network configured to perform one or more applications on the network;
   if a response to the discovery query is received indicating another node as the master node for the group, storing information indicating that the other node is the master node for the group; and
   if no response to the discovery query is received, the node assuming the role of master node for the group;

wherein, the master node for the group is configured to provide or control one or more functions for the nodes in the group; and wherein the group of nodes are peer nodes in a peer group on the network, wherein the scope of said broadcasting is the peer group, wherein the peer group is implemented in accordance with a peer-to-peer platform comprising one or more peer-to-peer platform protocols for enabling peer nodes to discover each other, communicate with each other, and cooperate with each other to form peer groups and share content in a peer-to-peer networking environment.

27. The computer-accessible storage medium as recited in claim 26, wherein the program instructions are further computer-executable to implement, if the node assumes the role of master node for the group, broadcasting the node's presence as master node for the group.

28. The computer-accessible storage medium as recited in claim 26, wherein the program instructions are further computer-executable to implement, if the node assumes the role of master node for the group, and if one or more other nodes also self-elect as master nodes for the group, the node negotiating with the other nodes that have self-elected as master nodes to determine which one of the nodes is to serve as the master node for the group.

29. The computer-accessible storage medium as recited in claim 26, wherein the program instructions are further computer-executable to implement, if another node in the group is the master node for the group, and if that other node becomes unavailable:

the node detecting that the master node has become unavailable; and the node assuming the role of master node for the group.

30. The computer-accessible storage medium as recited in claim 26, wherein the peer group extends across two or more subnetworks on the network.

* * * * *